United States Patent
Malakhova et al.

(10) Patent No.: US 10,637,751 B2
(45) Date of Patent: Apr. 28, 2020

(54) METHODS AND SYSTEMS FOR ONLINE MONITORING USING A VARIABLE DATA SAMPLING RATE

(71) Applicant: General Electric Company, Schenectady, NY (US)

(72) Inventors: Olga Malakhova, Minden, NV (US); John Wesley Grant, Gardnerville, NV (US); Mel Maalouf, Minden, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/369,819

(22) Filed: Mar. 29, 2019

(65) Prior Publication Data

US 2019/0288925 A1   Sep. 19, 2019

Related U.S. Application Data

(63) Continuation of application No. 13/756,330, filed on Jan. 31, 2013, now Pat. No. 10,250,463.

(51) Int. Cl.
*H04L 12/26* (2006.01)
*G05B 21/02* (2006.01)

(52) U.S. Cl.
CPC ............ *H04L 43/024* (2013.01); *G05B 21/02* (2013.01); *Y04S 40/168* (2013.01)

(58) Field of Classification Search
CPC ...... G05B 21/02; H04L 43/024; Y04S 40/168
See application file for complete search history.

(56) References Cited

U.S. PATENT DOCUMENTS

| | | | |
|---|---|---|---|
| 5,231,872 | A | 8/1993 | Bowler et al. |
| 6,016,550 | A | 1/2000 | Kokkosoulis et al. |
| 6,442,496 | B1 | 8/2002 | Pasadyn et al. |
| 7,113,838 | B2 | 9/2006 | Funk et al. |
| 7,263,597 | B2 | 8/2007 | Everdell et al. |
| 7,558,687 | B1 * | 7/2009 | Bode ............ G05B 21/02 700/14 |
| 7,571,478 | B2 | 8/2009 | Munson et al. |
| 7,647,131 | B1 | 1/2010 | Sadowski et al. |
| 7,730,364 | B2 | 6/2010 | Chang et al. |
| 7,768,413 | B2 | 8/2010 | Kosuge et al. |
| 2005/0197792 | A1 | 9/2005 | Haeuptle |

(Continued)

FOREIGN PATENT DOCUMENTS

| | | |
|---|---|---|
| EP | 2042960 A2 | 4/2009 |
| GB | 1403968 A | 8/1975 |

OTHER PUBLICATIONS

Search Report from Corresponding PCT/US2014/010318 dated May 9, 2014.

*Primary Examiner* — Abdullahi E Salad
(74) *Attorney, Agent, or Firm* — Mintz Levin Cohn Ferris Glovsky and Popeo, P.C.

(57) ABSTRACT

A method for online monitoring of a physical environment using a variable data sampling rate is implemented by a computing device. The method includes sampling, at the computing device, at least one data set using at least one sampling rate. The method also includes processing the at least one data set with condition assessment rules. The method further includes determining whether the at least one data set indicates a change in state of the physical environment. The method additionally includes updating the at least one sampling rate.

20 Claims, 4 Drawing Sheets

(56) References Cited

U.S. PATENT DOCUMENTS

| | | |
|---|---|---|
| 2006/0259154 A1 | 11/2006 | Hood et al. |
| 2008/0062004 A1 | 3/2008 | Hammerschmidt |
| 2008/0084295 A1 | 4/2008 | Libby |
| 2008/0178663 A1 | 7/2008 | Yang et al. |
| 2009/0082919 A1* | 3/2009 | Hershey ................ F02D 41/249 701/33.4 |
| 2009/0089558 A1* | 4/2009 | Bradford ................ G05B 21/02 712/225 |
| 2012/0029314 A1* | 2/2012 | Paquet ............... A61B 5/02055 600/301 |
| 2014/0077964 A1* | 3/2014 | Beligere ................ E21B 47/00 340/853.3 |
| 2014/0089024 A1* | 3/2014 | Mason ................... G06Q 10/06 705/7.12 |

* cited by examiner

METHODS AND SYSTEMS FOR ONLINE MONITORING USING A VARIABLE DATA SAMPLING RATE

The Application is a continuation of U.S. patent application Ser. No. 13/756,330, filed Jan. 31, 2013, entitled "METHODS AND SYSTEMS FOR ONLINE MONITORING USING A VARIABLE DATA SAMPLING RATE," which is hereby incorporated by reference in its entirety.

BACKGROUND OF THE INVENTION

The field of the invention relates generally to monitoring and sampling data, and more particularly to methods and systems for use in online monitoring using a variable data sampling rate.

Known methods of monitoring physical environments may include monitoring data received from physical environments and components of physical environments. Physical environments may include physical machines, physical systems, or combinations thereof. Received data may come in a variety of forms including scalar data, wave form data, and object-based data. In some cases, particularly wave form data, receiving such data may require significant resources, especially computational, storage, and network resources. Further, in some cases a monitored physical environment may have many independent components which are being monitored. Thus, in such cases, complete monitoring of all received data may be a significant burden on the system by straining resources including computational resources and networking resources.

Many known methods to resolve this complexity involve the use of sampling methods. In such known methods, sampling involves taking a fraction of received data and thereby reducing the burden on system resources. Such sampling introduces an additional complexity, however, by reducing or impacting the responsiveness of a monitoring system to a change in state of the physical environment. If a sampling rate is set infrequently, a change in state may be detected slowly and accordingly, responded to slowly.

BRIEF DESCRIPTION OF THE INVENTION

In one aspect, a method for online monitoring of a physical environment using a variable data sampling rate is provided. The method is implemented by a computing device. The method includes sampling, at the computing device, at least one data set using at least one sampling rate. The method also includes processing the at least one data set with condition assessment rules. The method further includes determining whether the at least one data set indicates a change in state of the physical environment. The method additionally includes updating the at least one sampling rate.

In another aspect, a computer-implemented system for online monitoring of a physical environment using a variable data sampling rate is provided. The system includes a monitoring system capable of monitoring the physical environment using a plurality of sensors. The system also includes a computing device configured to communicate with the online monitoring system. The computing device includes a processor and a memory device coupled to the processor. The computing device also includes a storage device coupled to the memory device and to the processor. The computing device is configured to sample at least one data set using at least one sampling rate from the online monitoring system. The computing device is also configured to process the at least one data set with condition assessment rules. The computing device is further configured to determine whether the at least one data set indicates a change in state of the physical environment. The computing device is additionally configured to update the at least one sampling rate.

In another aspect, a computer for online monitoring of a physical environment using a variable data sampling rate is provided. The computer includes a processor and a memory device coupled to the processor. The computer also includes a storage device coupled to the memory device and to the processor. The computer is configured to sample at least one data set using at least one sampling rate from an online monitoring system. The computer is also configured to process the at least one data set with condition assessment rules. The computer is further configured to determine whether the at least one data set indicates a change in state of the physical environment. The computer is additionally configured to update the at least one sampling rate.

DETAILED DESCRIPTION OF THE INVENTION

As used herein, the term "physical system" and related terms, e.g., "physical systems," refers to any system composed of one or more parts that has a physical presence. Physical systems may include, without limitation, vehicles, transportation systems, manufacturing facilities, chemical processing facilities, power generation facilities, infrastructure systems, and communication systems. Physical systems may also include, without limitation, complex chemical or biological systems where components of such systems may have sensor measurements associated.

As used herein, the term "sensor" and related terms, e.g., "sensors," refers to a devices attached to a monitoring system that may detect condition data related to a physical system at a given point in time. Also, as used herein, sensors facilitate the detection of condition data and the transmission of the condition data to a monitoring system.

As used herein, the term "online monitoring" refers to the use of a monitoring system to continuously monitor a physical system. Also, as used herein, online monitoring is used to create the condition data set from which the system described herein samples data.

As used herein, the term "condition data" refers to the data detected by the online monitoring systems through the use of sensors where the condition data indicate the condition of the physical system. As used herein, condition data may refer to data including, without limitation, vibration data, thermal data, pressure data, electric data, or any other data that may be useful in determining the state of the physical system. Also, as used herein, condition data are typically sampled at a variable sampling rate to yield sampling data.

As used herein, the term "sampling data" refers to any form of data that may be detected using an online monitoring system and sampled using the methods and systems described herein. Sampling data may include, without limitation, wave form data, scalar data, vector data, numeric data, or any other data capable of being detected using the sensors in an online monitoring system and sampled using the sampling method and system described herein.

As used herein, the term "sampling rate" refers to the frequency with which continuously monitored data are selected in order to have a representative sample of such data. The sampling rate is used in an online monitoring system to convert condition data to sampling data. As a sampling rate increases or becomes more frequent, sampling data more closely approximates condition data.

Figure 1:
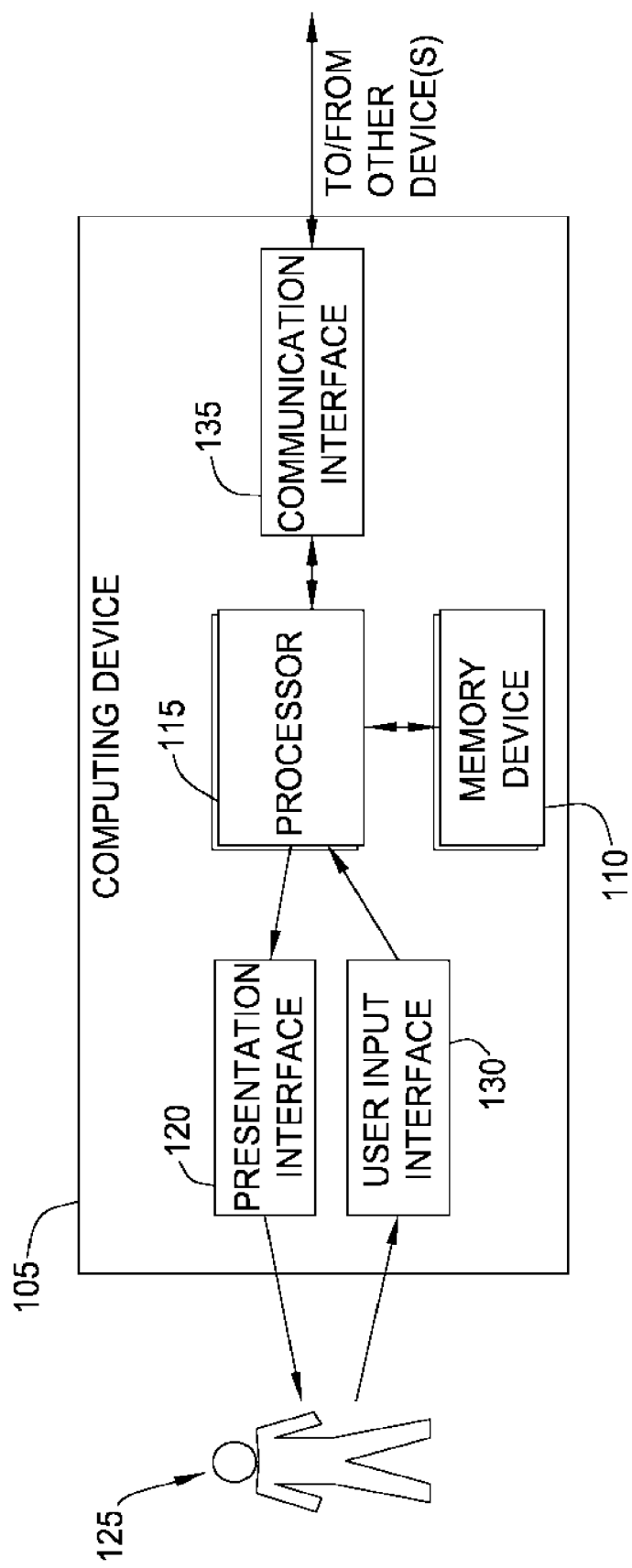
FIG. 1 is a block diagram of an exemplary computing device that may be used in a computer-implemented system for online monitoring of a physical system using a variable data sampling rate.

FIG. 1 is a block diagram of an exemplary computing device 105 that may be used in a computer-implemented system for online monitoring of a physical system using a variable data sampling rate.

Computing device 105 includes a memory device 110 and a processor 115 operatively coupled to memory device 110 for executing instructions. Processor 115 may include one or more processing units (e.g., in a multi-core configuration). In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110.

In the exemplary embodiment, memory device 110 is one or more devices that enable storage and retrieval of information such as executable instructions and/or other data. Memory device 110 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Also, in the exemplary embodiment, memory device 110 includes a sparse distributed memory (SDM) configuration, wherein such SDM configuration is defined using software. Alternatively, such SDM configuration is defined using any combination of SDM-capable hardware and SDM-compatible software that enables online monitoring of a physical system using a variable data sampling rate as described herein.

As used herein, the terms "software" and "firmware" are interchangeable, and include any computer program stored in memory for execution by devices that include, without limitation, mobile devices, clusters, personal computers, workstations, clients, and servers.

Memory device 110 may be configured to store operational measurements from an online monitoring system including, without limitation, wave form data, vector data, numeric data, and/or any other type of data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate operation of the online monitoring of a physical system using a variable data sampling rate (discussed further below).

In some embodiments, computing device 105 includes a presentation interface 120 coupled to processor 115. Presentation interface 120 presents information, such as a user interface and/or an alarm, to a user 125. In some embodiments, presentation interface 120 includes one or more display devices.

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., including, without limitation, a touch pad or a touch screen), and/or an audio input interface (e.g., including, without limitation, a microphone). A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
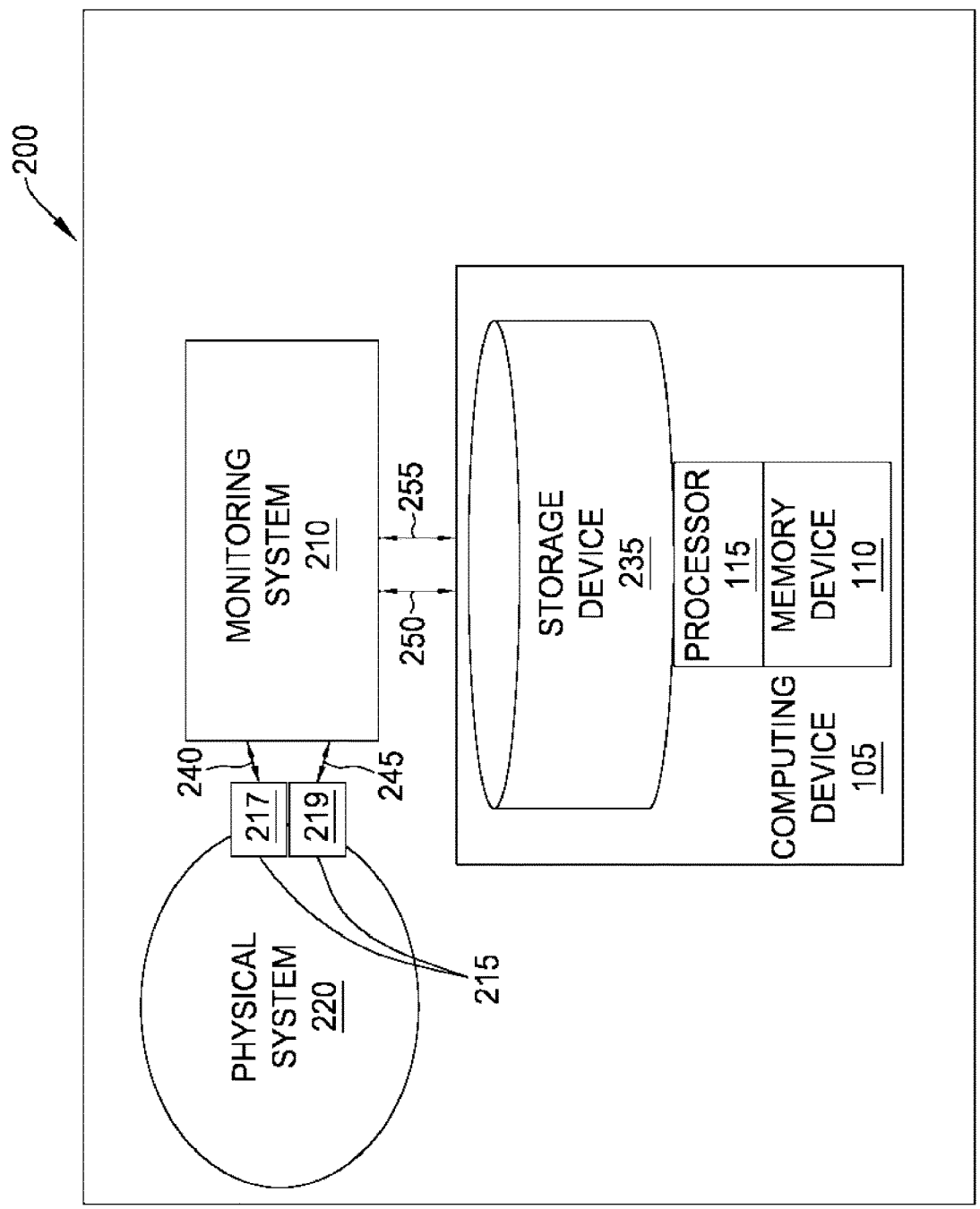
FIG. 2 is a block diagram of an exemplary computer-implemented system that may be used for online monitoring of a physical system using a variable data sampling rate that may include the computing device shown in FIG. 1.

FIG. 2 is a block diagram of an exemplary computer-implemented system 200 that may be used for online monitoring of a physical system 220 using a variable data sampling rate that may include computing device 105 (shown in FIG. 1). Computer-implemented system 200 includes a monitoring system 210 capable of monitoring physical system 220 using a plurality of sensors 215. In the exemplary embodiment, monitoring system 210 is a condition monitoring system capable of monitoring physical system 220. Monitoring system 210 is capable of diagnostics, alerts, and coordinating maintenance of problems in physical system 220. In alternative embodiments, monitoring system 210 may include additional attributes or subsets of these capabilities. In the exemplary embodiment, physical system 220 is a hydro turbine generator. In alternative embodiments, physical system may include, without limitation, wind turbines, electrical equipment, reciprocating compressors, turbomachinery, oil and/or gas refineries, petroleum processing systems, or any other physical system capable of being monitored by computer-implemented system 200.

Computer-implemented system 200 also includes a computing device 105 capable of communicating with monitoring system 210. In the exemplary embodiment, computing device 105 and monitoring system 210 are distinct. In alternative embodiments, computing device 105 and monitoring system 210 may be co-resident on the same computing device. In other embodiments, monitoring system 210 may represent multiple physical monitoring systems. Computing device 105 includes processor 115 and memory device 110. Computing device 105 also includes storage device 235. Storage device 235 is coupled to processor 115 and to memory device 110. Storage device 235 is configured to be capable of storing received data including, without limitation, data described below.

In operation, monitoring system 210 detects condition data from sensors 215. In the exemplary embodiment, sensors 215 include a first sensor 217 and a second sensor 219. In alternative embodiments, sensors 215 may include any number of sensors. In the exemplary embodiment, first sensor 217 and second sensor 219 detect data from different physical sections of physical system 220. Monitoring system 210 detects condition data from each sensor distinctly. In alternative embodiments, sensors 215 may detect data from the same sections or different sections of physical system 220 and may generate similar types of data or divergent types of data. In the exemplary embodiment, monitoring system 210 detects first condition data 240 from first sensor 217 and second condition data 245 from second sensor 219. In the exemplary embodiment, first condition data 240 and second condition data 245 are both waveform data. Waveform data can consume significant resources in terms of network bandwidth, storage, and memory. Because of this, monitoring system 210 samples data at a particular sampling rate to generate sampled data.

Sampled data represent a "snapshot" of condition data at a point in time and each "snapshot" is separated by an interval corresponding to the sampling rate. In the exemplary embodiment, first condition data 240 and second condition data 245 are sampled at distinct sampling rates. In alternative embodiments, they may be sampled at identical sampling rates. Sampling rates may be at any interval of time including, without limitation, a number of hours, a number of minutes, a number of seconds, a number of milliseconds, a number of microseconds, and a number of nanoseconds. Monitoring system 210 transmits sampled data as first sampled data 250 corresponding to first condition data 240 and second sampled data 255 corresponding to second condition data 245 to computing device 105.

Computing device 105 receives first sampled data 250 and second sampled data 255 through a data network (not shown). The data network may include, without limitation, local area networks (LAN), wireless networks, wide area networks (WAN), backbone networks, or any other kind of network capable of transmitting and receiving information described in this system. Computing device 105 is capable of processing data at processor 115 to determine sampling rates. In the exemplary embodiment, processor 115 initially defines unique schedules for each sampled data. For example, in the exemplary embodiment, processor 115 will set a sampling rate and schedule for first condition data 240 and second condition data 245 so that first condition data 240 are minimally sampled at the same time as second condition data 245. This scheduling minimizes the impact on system resources including, without limitation, bandwidth, processing, and storage. Processor 115 determines unique schedules for each sampled data using distinct-prime factorization methods. These methods use distinct-prime numbers as factors of sampling rates. Because prime factors are inherently unique, this allows for distinct sampling rates. In most cases this will ensure that sampling will not overlap. However, overlapping may become necessary even when applying such methods if sufficient numbers of waveform data and/or frequency of sampling are required.

Computing device 105 is also capable of changing the sampling rates of sampling using processor 115 by applying condition assessment rules. Computing device 105 initially receives sampled data (e.g., first sampled data 250 and second sampled data 255) at a given sampling rate determined by the distinct-prime factorization method described above. Computing device 105 also includes condition assessment rules which can be run against sampled data. Condition assessment rules may be stored on memory device 110, storage device 235, external storage (not shown), or may be input by a user (not shown in FIG. 2). Condition assessment rules are used to determine whether a change in state has occurred in physical system 220 based upon sampled data. Condition assessment rules are executed by processor 115 applying the rules to sampled data. When condition assessment rules are executed by processor 115, processor 115 will determine a new sampling rate that updates the previous sampling rate for each sampled data. Updating the rate may include increasing the sampling rate, reducing the sampling rate, or holding the sampling rate substantially constant. For example, the rate may be increased if physical system 220 is determined by the condition assessment rules to have entered an anomalous state. In such cases, there is value in increasing the frequency of monitoring to assess the severity or validity of the anomalous state. Increased frequency of monitoring, caused by the increase in sampling rate, can allow for system 200 and the individuals who maintain physical system 220 to be more responsive to diagnostic, maintenance, or other issues created by a potential anomalous condition. The rate may be decreased if physical system 220 is determined by the condition assessment rules to have left an anomalous state. In such a situation, once system 200 has validated that physical system 220 is no longer anomalous, resource costs of more frequent sampling may no longer be justified. Alternately, the rate may be increased if physical system 220 is determined by the condition assessment rules to have left an anomalous state. In such a situation, it may be valuable to quickly validate that physical system 220 has actually left an anomalous state and resources used by increased sampling will be justified. The rate may also be decreased if physical system 220 is determined by the condition assessment rules to be in an anomalous condition but such condition has been confirmed. In cases where diagnostics or maintenance may be time consuming, it may no longer be valuable to continue to monitor physical system 220 heavily if its condition of anomaly is already known. The rate may be left unchanged if physical system 220 has not changed based upon the application of condition assessment rules.

In some embodiments, a threshold setting for a minimum time threshold between changes in physical state may be defined. The minimum time threshold may define the minimum time that must pass between two determinations of a change in state. The minimum time threshold may be stored in computing device 105 at memory device 110 or storage device 235. In these embodiments, condition assessment rules may indicate that a change in state of physical system 220 has occurred previously and is now occurring again but a change in the sampling rate will not occur. This threshold may be defined in situations where a system has recently been repaired and is recovering or where data may be unreliable. The threshold may alternatively be defined when a change in state has been previously reported, maintenance has not been scheduled for an extended period of time, and there is no reason to repeat the event and thereby increase the sampling rate. This may occur, for example, when the change in state is from a normal state to a low severity level anomaly state.

In the exemplary embodiment, in addition to changing the sampling rate after a change in state of physical system 220 is determined, computing device 105 may record the change in state as a historical event. The historical event may be saved at memory device 110, storage device 235, or on external storage. In these embodiments, computing device 105 will also transmit the change in state to an external system including, for example, monitoring system 210. Monitoring system 210 may record historical detections of changes in state and sampling rates in conjunction with other monitoring records. In some embodiments, despite a change in state of physical system 220, computing device 105 will delay at least one of updating the sampling rate and transmitting the change in state to an external system. A delay may be made for several reasons. First, updating the sampling rate may be delayed to avoid simultaneous sampling from different components of the physical system. Due to the network and system resources discussed above, it may be advantageous to avoid such simultaneous sampling. Second, a delay may occur if a machine in physical system 220 is expected to go through a sequence of known states where rapid sampling would be inappropriate. Transmitting the change in state may be delayed because it may be valuable to wait longer to confirm the change in state of physical system 220, to avoid redundant data, or to minimize resource overhead. Delaying may occur based upon a threshold waiting period defined by a user, computing device 105 applying heuristic algorithms, or externally received data.

Figure 3:
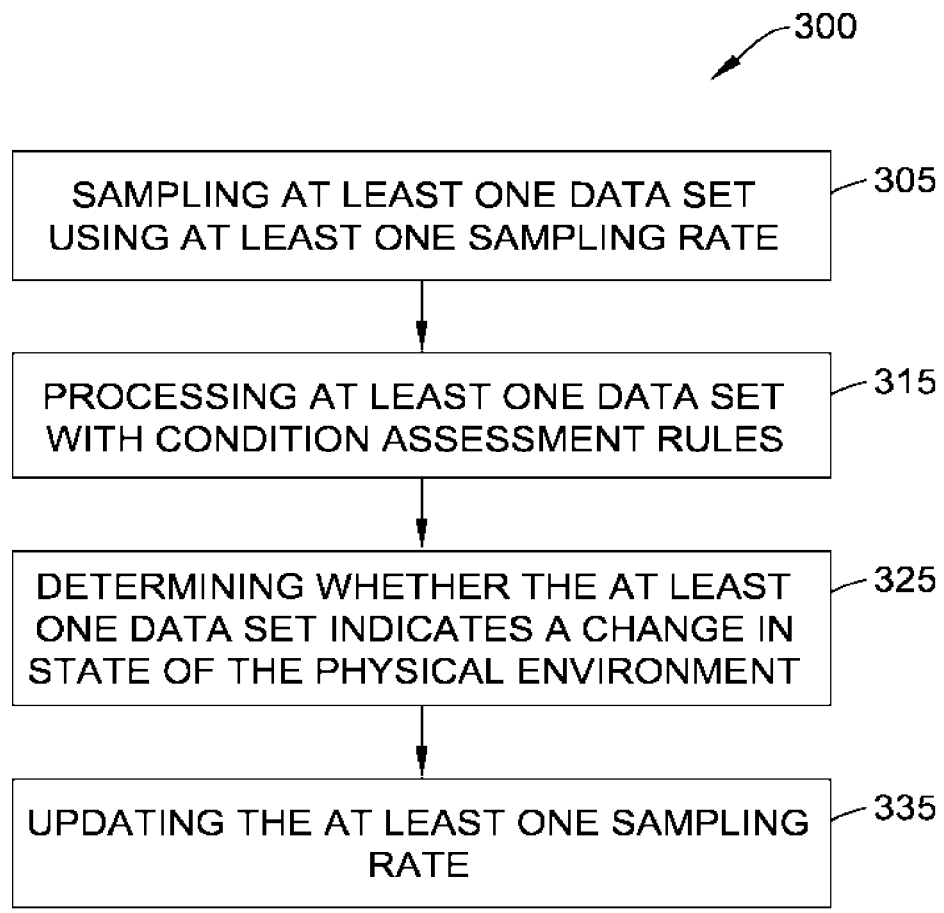
FIG. 3 is a flowchart of an exemplary method that may be implemented to be used in online monitoring of a physical system using a variable data sampling rate that may use the computer-implemented system shown in FIG. 2.

FIG. 3 is a flowchart of an exemplary method 300 that may be implemented to be used in online monitoring of physical system 220 using a variable data sampling rate using computer-implemented system 200 (shown in FIG. 2). Method 300 is executed at processor 115 in computing device 105. Processor 115 samples 305 at least one data set scheduled for sampling using at least one sampling rate. Sampling 305 represents receiving sampled data (e.g., first sampled data 250 and second sampled data 255) from monitoring system 210 where sampled data represents data sampled from condition data using at least one sampling rate. Processor 115 also processes 315 at least one data set with condition assessment rules. Processing 315 at least one data set with condition assessment rules represents applying condition assessment rules stored in memory device 110 or storage device 235 on the sampled data. Processor 115 further determines 325 whether the at least one data set indicates a change in state of the physical environment. Determining 325 whether the at least one data set indicates a change in state of the physical environment represents processor 115 identifying whether a change in state of physical system 220 has occurred. Processor 115 finally updates 335 the at least one sampling rate. Updating 335 the at least one sampling rate represents increasing, reducing, or holding constant the sampling rate. In some embodiments, updating 335 the at least one sampling rate also represents changing sampling rate for a first condition data 240 so that first sampled data 250 is not sampled at the same time as second sampled data 255.

Figure 4:
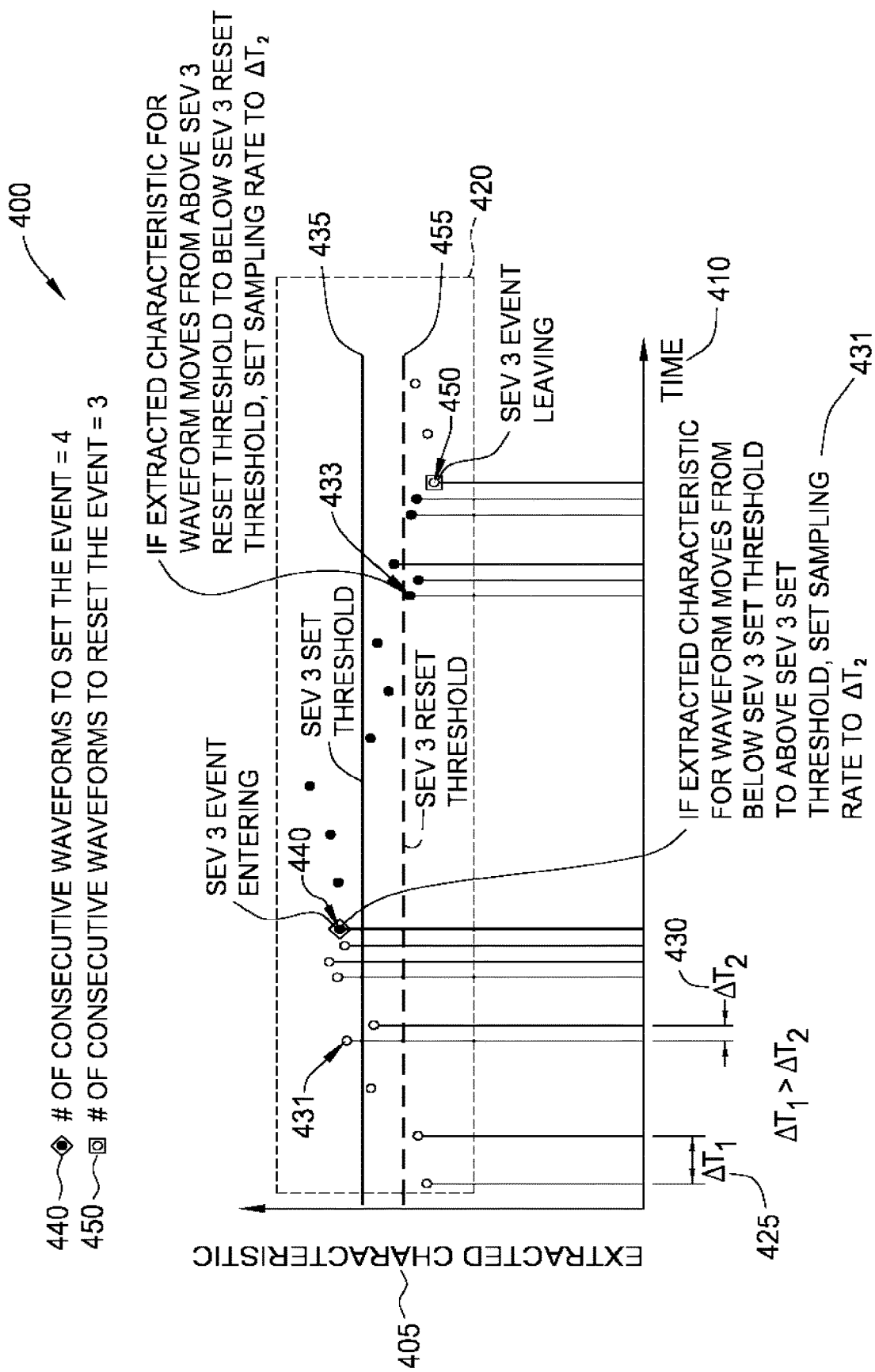
FIG. 4 is a simplified illustration of data sampled at varying rates by the computer-implemented system shown in FIG. 2.

FIG. 4 is a simplified illustration 400 of data sampled at varying rates by computer-implemented system 200 (shown in FIG. 2). Illustration 400 displays a graph indicating sampled data over a time period. The vertical axis 405, labeled "Extracted Characteristic" reflects a scalar value associated with waveform data. Therefore, as there are twenty-three values for "Extracted Characteristic" 405, this reflects twenty-three waveforms which were sampled and from which twenty-three "Extracted Characteristic" 405 values were determined. The label "Extracted Characteristic" 405 reflects the isolation of the values from the sampled waveform data that are of interest in determining the condition of physical system 220. In alternative embodiments, "Extracted Characteristic" 405 may not be representable by a scalar value and instead may require multidimensional analysis or other complex analysis. Illustration 400 presents particular values of "Extracted Characteristic" 405 presented over the horizontal axis 410 representing time. Illustration 400 presents values 420 of "Extracted Characteristic" 405 for points in time 410.

Illustration 400 demonstrates the application of condition assessment rules. Initially "Extracted Characteristic" 405 values 420 are sampled at a first sampling rate 425. On the fourth data point of "Extracted Characteristic" 405 values 420, "Extracted Characteristic" 405 exceeds a threshold value 435 indicated by the solid line. At this point, the sampling rate is changed to a second sampling rate 430 because of a first condition assessment rule 431. Condition assessment rule 431 has identified a potential change in physical system 220 because of the value for "Extracted Characteristic" 405 exceeding threshold value 435 and accordingly changes sampling rate to second sampling rate 430.

A second condition assessment rule 440 is now invoked to confirm the presence of a change in physical system 220. Rule 440 represents a condition assessment rule for a Severity 3 or Sev 3 Event. The Severity 3 event is used when there is confirmation that physical system 220 has changed. Rule 440 defines a Severity 3 event as four consecutive "Extracted Characteristic" 405 values 420 exceeding threshold value 435. Although the fourth "Extracted Characteristic" 405 value 420 exceeds the line threshold value 435 associated with rule 440, a Sev 3 Event is not triggered until the ninth "Extracted Characteristic" 405 value 420. When second condition assessment rule 440 is satisfied, the sampling rate moves from second sampling rate 430 back to first sampling rate 425 because there is no need for frequent sampling.

A third condition assessment rule 433 is invoked on the sixteenth "Extracted Characteristic" 405 value 420 when "Extracted Characteristic" drops back below reset threshold value 455. At this point, the sampling rate is changed back to second sampling rate 430 because third condition assessment rule 433 is satisfied. Condition assessment rule 433 has identified a new potential change in physical system 220 because of the value for "Extracted Characteristic" 405 has fallen below reset threshold value 455.

A fourth condition assessment rule 450 is now invoked to confirm the presence of a change in physical system 220. Rule 450 represents a condition assessment rule for a reset or end of a Severity 3 or Sev 3 Event. The reset of Severity 3 event is confirmed when there is confirmation that physical system 220 has changed back to a normal state. Rule 450 defines a Severity 3 reset event as three consecutive "Extracted Characteristic" 405 values 420 falling below reset threshold value 455. Although the sixteenth "Extracted Characteristic" 405 value 420 falls below reset threshold 455, a Sev 3 Event reset is not triggered until the twenty-first "Extracted Characteristic" 405 value 420. When fourth condition assessment rule 450 is satisfied, the sampling rate changes from second sampling rate 430 back to first sampling rate 425 because there is no need for frequent sampling.

In contrast to known, conventional systems and methods for online monitoring, the systems and methods as described herein facilitate increasing the efficiency and responsiveness of the online monitoring of a physical system. Also, such systems and methods facilitate reducing the cost of monitoring a physical system. Further, such systems and methods facilitate improving the monitoring of the physical system by selectively altering sampling rates at relevant times.

An exemplary technical effect of the methods, systems, and apparatus described herein includes at least one of: (a) improving the resource utilization of online monitoring systems through effective scheduling of sampling that is responsive to conditions and interdependencies; (b) improving responsiveness of online monitoring systems to changes in conditions by selectively altering sampling rates; (c) improving the maintenance of physical systems by efficient and responsive monitoring; and (d) reducing redundant identifications of changes in state of physical system.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A method for continuous monitoring of a physical environment using a variable data sampling rate, said method implemented by a computing device, said method comprising:
  receiving at least one data set of condition data from at least one sensor coupled to the physical environment;
  determining a schedule to sample the at least one data set of condition data, wherein the schedule is determined using distinct prime-factorization to schedule each data set sampling at a distinct point in time;
  sampling the at least one data set of condition data using at least one sampling rate and based on the determined schedule, wherein said computing device includes a sparse distributed memory configuration;
  applying at least one condition assessment rule to the at least one data set of condition data;
  determining whether said at least one data set of condition data indicates a change in state of the physical environment;
  updating said at least one sampling rate; and
  outputting at least one modified data set based on the updated sample rate, the outputting including providing the at least one modified data set via presentation interface of the computing device.

2. The method of claim 1, wherein said at least one data set of condition data is sampled from a continuous monitoring system, the continuous monitoring system is at least one of:
  an external monitoring system;
  a plurality of external monitoring systems; and
  said computing device.

3. The method of claim 1, wherein said condition data includes vibration data, thermal data, pressure data, electric data, or state data associated with the physical environment.

4. The method of claim 1, wherein updating said at least one sampling rate comprises at least one of:
  increasing the at least one sampling rate;
  reducing the at least one sampling rate; and
  holding the at least one sampling rate substantially constant.

5. The method of claim 4, wherein updating said at least one sampling rate further comprises:
  determining whether a change in state has been previously identified; and
  updating said at least one sampling rate only if the change in state has been previously identified outside a defined threshold interval.

6. The method of claim 1, wherein determining whether said at least one data set of condition data indicates a change in state of the physical environment comprises:
  storing the change in state of the physical environment in at least one of a memory device, a storage device, and an external storage device; and
  transmitting the change in state to an external system.

7. The method of claim 6, further comprising delaying at least one of:
  updating said at least one sampling rate; and
  transmitting the change in state to an external system, based upon thresholds including at least one of:
    user defined thresholds;
    machine learning thresholds; and
    externally received data.

8. A computer-implemented system for continuous monitoring of a physical environment using a variable data sampling rate comprising:
   an continuous monitoring system capable of monitoring the physical environment using a plurality of sensors; and
   a computing device configured to communicate with said continuous monitoring system including a processor, a memory device coupled to said processor and including a sparse distributed memory configuration, and a storage device coupled to said memory device and to said processor, said computing device configured to:
      receive at least one data set of condition data from at least one sensor of the plurality of sensors coupled to the physical environment;
      determine a schedule to sample the at least one data set of condition data, wherein the schedule is determined using distinct prime-factorization to schedule each data set sampling at a distinct point in time;
      sample at least one data set of condition data using at least one sampling rate from said continuous monitoring system and based on the determined schedule;
      apply at least one condition assessment rule to the at least one data set of condition data;
      determine whether the at least one data set of condition data indicates a change in state of the physical environment;
      update said at least one sampling rate; and
      output at least one modified data set based on the updated sample rate, the outputting including providing the at least one modified data set via presentation interface of the computing device.

9. The computer-implemented system of claim 8, wherein said continuous monitoring system further comprises at least one of:
   an external monitoring system;
   a plurality of external monitoring systems; and
   said computing device.

10. The computer-implemented system of claim 8, wherein said condition data includes vibration data, thermal data, pressure data, electric data, or state data associated with the physical environment.

11. The computer-implemented system of claim 8, wherein the computing device is further configured to at least one of:
   increase said at least one sampling rate;
   reduce said at least one sampling rate; and
   hold said at least one sampling rate substantially constant.

12. The computer-implemented system of claim 11, wherein the computing device is further configured to:
   determine whether a change in state has been previously identified; and
   update said at least one sampling rate only if the change in state has been previously identified outside a defined threshold interval.

13. The computer-implemented system of claim 8, wherein the computing device is further configured to:
   store the change in state of the physical environment in at least one of a memory device, a storage device, and an external storage device; and
   transmit the change in state to an external system.

14. The computer-implemented system of claim 13, wherein the computing device is further configured to delay at least one of:
   updating said at least one sampling rate; and
   transmitting the change in state to an external system based upon thresholds including at least one of:
      user defined thresholds;
      machine learning thresholds; and
      externally received data.

15. A computer for continuous monitoring of a physical environment using a variable data sampling rate comprising:
   a processor;
   a memory device coupled to said processor and including a sparse distributed memory configuration; and
   a storage device coupled to said memory device and to said processor, said computer configured to:
      receive at least one data set of condition data from at least one sensor of the plurality of sensors coupled to the physical environment;
      determine a schedule to sample the at least one data set of condition data, wherein the schedule is determined using distinct prime-factorization to schedule each data set sampling at a distinct point in time;
      sample at least one data set of condition data using at least one sampling rate from a continuous monitoring system and based on the determined schedule;
      apply at least one condition assessment rule to the at least one data set of condition data;
      determine whether the at least one data set of condition data indicates a change in state of the physical environment;
      update said at least one sampling rate; and
      output at least one modified data set based on the updated sample rate, the outputting including providing the at least one modified data set via presentation interface of the computing device.

16. The computer of claim 15, wherein said condition data includes vibration data, thermal data, pressure data, electric data, or state data associated with the physical environment.

17. The computer of claim 15, wherein said computer configured to update said at least one sampling rate is configured to at least one of:
   increase said at least one sampling rate;
   reduce said at least one sampling rate; and
   hold said at least one sampling rate substantially constant.

18. The computer of claim 17, wherein said computer configured to update said at least one sampling rate is further configured to:
   determine whether a change in state has been previously identified; and
   update said at least one sampling rate only if the change in state has been previously identified outside a defined threshold interval.

19. The computer of claim 15, wherein the computer configured to determine whether the at least one data set of condition data indicates a change in state of the physical environment is further configured to:
   store the change in state of the physical environment in at least one of a memory device, a storage device, and an external storage device; and
   transmit the change in state to an external system.

20. The computer of claim 19, wherein the computer configured to determine whether the at least one data set of condition data indicates a change in state of the physical environment is further configured to delay at least one of:
   updating said at least one sampling rate; and
   delay transmitting the change in state to an external system based upon thresholds including at least one of:
      user defined thresholds;
      machine learning thresholds; and
      externally received data.

* * * * *